United States Patent [19]

Gloriod et al.

[11] 4,029,875

[45] June 14, 1977

[54] RADICAL POLYMERIZATION OF ETHYLENE IN THE PRESENCE OF CYCLIC OLEFIN

[75] Inventors: Pierre Gloriod, Lillebonne; Jean Pierre Machon, Bethune, both of France

[73] Assignee: Societe Chimique des Charbonnages-CdF Chimie, Paris, France

[22] Filed: Apr. 21, 1976

[21] Appl. No.: 678,748

[30] Foreign Application Priority Data

Apr. 22, 1975 France .............................. 75.12511

[52] U.S. Cl. .............................. 526/308; 526/11.1; 526/64; 526/89; 526/213; 526/216; 526/227; 526/232; 526/272; 526/281; 526/282; 526/331; 526/347; 526/352

[51] Int. Cl.² ....................... C08F 2/38; C08F 2/40

[58] Field of Search .......... 526/282, 308, 347, 281, 526/213, 216, 227, 232, 89

[56] References Cited

UNITED STATES PATENTS

| | | | |
|---|---|---|---|
| 3,029,230 | 4/1962 | Strauss .............................. | 260/87.3 |
| 3,127,387 | 3/1964 | Ham et al. ......................... | 260/94.9 |
| 3,317,504 | 5/1967 | Kinkel et al. ...................... | 260/94.9 |
| 3,520,862 | 7/1970 | Taniguchi et al. ................. | 260/88.2 |

FOREIGN PATENTS OR APPLICATIONS 1,926,168  11/1970  Germany .................... 526/209 UX

*Primary Examiner*—Stanford M. Levin
*Attorney, Agent, or Firm*—Finnegan, Henderson, Farabow & Garrett

[57] ABSTRACT

Radical polymerization of ethylene in the presence of an initiator and up to 500 ppm of a cyclic olefin having from 5 to 12 carbon atoms and a ring of 5 to 9 members or styrene and its alkyl homologues.

5 Claims, No Drawings

RADICAL POLYMERIZATION OF ETHYLENE IN THE PRESENCE OF CYCLIC OLEFIN

The present invention relates to an improved process for the radical polymerization of ethylene. More particularly, the present invention relates to an improved process for the radical polymerization or copolymerization of ethylene in the presence of initiators, at temperatures above 220° C and under pressures above 1000 bars.

A constant desire of polyethylene manufactures using radical ppolymerization is to maintain good optical and mechanical properties in the finished resin products, while at the same time, reducing the cost of manufacture of the products. It is known, for example, in U.S. Pat. No. 3,349,072 to improve the optical properties of polyethylene film by effecting the polymerization in the presence of substituted phenols and diphenols, the additives being used in amounts sufficiently low to still meet food and toxicity standards. The same effect can be obtained by the addition of from about 50 to 500 ppm with respect to the ethylene of isoprene as described in French Pat. No. 2,090,630; or by using 0.06 to 6% of 3- or 4-methylpentene, according to Belgian Pat. 799,455. None of these processes, however, have succeeded in significantly reducing the costs of producing the polyethlene products. A possible method for reducing the costs could be obtained by providing a means for reducing the consumption of initiator per unit weight of the polymer used in the radical polymerization process, but to date no such satisfactory means has been found.

In accordance with the present invention, however, there is provided a means for significantly reducing the consumption of initiator in a radical polymerization process and hence its cost of manufacture while simultaneously improving the optical and mechanical properties of the polyethylene products produced by the polymerization process. More particularly, the present invention comprises in a radical polymerization process for ethylene in the presence of oxygen, peroxides or peresters as initiators, the improvement of simultaneously introducing an additive in amounts of up to 500 ppm based upon the weight of the ethylene of certain olefins selected from the group consisting of styrene and its homologues bearing alkyl substituents on the benzene nucleus and cyclic olefins having from 5 to 12 carbon atoms and a ring of 5 to 9 members. Preferably, the olefins are introduced at a temperature above 180° C because their effect is stronger as the temperature at which the are introduced with the initiator is increased.

It is to be understood that both the foregoing general description and the following detailed description are exemplary and explanatory, but are not restrictive of the invention.

Exemplary of suitable cyclic olefins which can be used in the present invention are cyclopentene, cyclohexene, alphapinene, cycloheptene and cyclooctene.

Exemplary of suitable styrene compounds that may be used in addition to styrene are p-methylstyrene or ethylstyrene.

Although the mechanism of action of these compounds is still not completely understood, it can be observed that their endocyclic double bond molecule distinguishes by the gain in conformational stability which results from their addition to a free radical, as from the detachment of a hydrogen atom in $\alpha$-position. The same is the case with styrenes which may give a secondary radical stabilized by resonance tautomerism. It is therefore probable that the radical originated from such a reaction has an average life-time and a reactivity which are rather great at high temperature and that it is able to act in the polymerization. It would therefore allow a better use of the initiator while keeping a constant supply of the latter.

In this regard, it is conventional in radical polymerization to add various chain transfer agents, such as ketones, aldehydes, alkanes, cyclanes or hydrogen to the reaction medium in the polymerization process to reduce the spread of the molecular weights. U.S. Pat. No. 3,127,387, for example, shows the use of cyclohexene as such a transfer agent in contents by weight of from 50 ppm to 5%, but at lower temperatures of only between 50° and 190° C.

This function of the cyclohexene, however, is entirely different from the function of the present additive compounds which have this delaying effect enabling reduction in initiator consumption only at temperatures above about 220° C and not at the lower temperatures conventionally used with transfer agents.

Compounds according to the invention enable two results to be obtained simultaneously. On the one hand, the achievement of an improvement in the optical and mechanical properties of the resin and on the other hand, a reduction in the cost of manufacture by up to 75% in the specific consumption of initiator, both of which are more amply demonstrated in the examples below.

These additive compounds can be used with a wide variety of oxygen/peroxide or perester initiators such as ditertbutyl, lauroyl, caprylyl, decanoyl, dicumyl and benzoyl peroxides, diterbutyl perpivalate, tertbutyl perbenzoate, tertbutyl ethyl 2-perhexanoate or mixtures thereof. The particular choice of initiator and the amount used, generally between about 10 to 500 ppm with respect to the weight of the ethylene, depends on the reaction temperature conditions as is well known to those skilled in the art.

The invention is further applicable, in addition to the polymerization of ethylene, to a variety of copolymerization processes in which the comonomer may be an alpha olefin such as propylene or butene, carbon monoxide, maleic anhydride or vinyl actate.

The study of the structural properties of the resins prepared by this improved process has shown that the spread of the molecular weights measured by gel permeation chromatography becomes narrower when the content of the additive increases, whereas correlatively the melt index measured in accordance with ASTM standard 10123865T increases. This explains the improvement in properties, in particular optical properties in terms of clarity, gloss and haze, by suppression of gels of super-high molecular weights.

The invention may be used in any process in the homogeneous phase, for example in a tubular reactor, in a stirred autoclave reactor, or in a reactor combining these two possibilities. More advantageous results are obtained, however, in an autoclave reactor than in a tubular reactor.

The optimum amount of additive depends essentially on the desired results of the manufacturer because the two principle results, i.e., the reduction of initiator consumption and the improvement in the optical and mechanical properties, are not always ideal for a given concentration of additive. Generally, the mechanical and optical properties tend to increase as the amount of additive is increased, whereas initator consumption decreases initially but then passes through a minimum for amounts of additive generally ranging from between 20 to 200 ppm based on the weight of the ethylene so that it increases again for higher amounts of additive. The manufacturer therefore must decide between the quality and the cost of manufacture according to the applications for which the product is designed. In any case, the additives according to the invention present an outstanding advantage when their content by weight with respect to the ethylene does not exceed 500 ppm.

Among the numerous applications of the resins produced by this process there may be mentioned especially the manufacture of films of different thicknesses for the packaging industry, as well as the covering of cables.

To illustrate the invention more specifically, reference is made to the following examples. These examples illustrate the radical polymerization of ethylene in the presence of initiators with various additives in varying amounts according to the present invention and the effect of these additives on the optical properties of the resulting polymer films and the consumption of the initiators used in the process.

The examples are merely illustrative and are to be understood as not limiting the scope and underlying principles of the invention in any way.

EXAMPLE 1

Polymerization of ethylene in the presence of cyclohexene is carried out in a stirred autoclave reactor having one 0.9 liter zone at a temperature of 250° C and under a pressure of 1500 bars. The initiator, ditertbutyl peroxide, is dissolved in a $C_{11}$–$C_{12}$ cut of saturated hydrocarbons containing the additive at a rate of 2 to 40 g/l.

The cyclohexene is heated and injected into the reactor at a temperature of 140° C. The cyclohexene, which in the presence of oxygen and light may give peroxides at room temperature, has been previously distilled and is kept under nitrogen in darkness and stabilized with a small amount of soda.

Table I shows the data relating to the tests made with increasing amounts of cyclohexene. To take into account the substantial fluctuations of the conversion rate, the specific initiator consumption (S.I.C.) has been related to constant production. Clarity was measured on a 50 $\mu$ film by means of a Gardner apparatus in accordance with ASTM standard D 1746.

TABLE I

| Cyclohexene (ppm) | 0 | 17 | 39 | 55 | 97 | 136 | 253 | 294 |
|---|---|---|---|---|---|---|---|---|
| S.I.C. (m.mols.kg-2) | 9.15 | 7.7 | 6.9 | 6.7 | 7.2 | 7.6 | 9.1 | 9.4 |
| Clarity | 1.8 | 1.8 | 2 |  | 4.3 | 6.0 |  |  |

It will be observed that the initiator consumption is lowest for a content of 55 ppm of additive and that this reduction in consumption with respect to a control (0% cyclohexene) is 27%.

The effect of the additive on the clarity of the film obtained from the resins in accordance with this process can also be seen to increase as the amount of the additive increases and becomes substantial when the content of the additive exceeds 100 ppm.

On replacing the cyclohexene by cyclooctene, comparable results are obtained.

EXAMPLE 2

In this example the polymerization reaction is conducted in the presence of the cyclohexene in a three-zone agitated autoclave reactor. The first and second zones, which are fed with tertbutyl ethyl 2-perhexanoate, operate at respective temperatures of 180° C and 190° C. A mixture of tertbutyl perbenzoate, ditertbutyl peroxide and cyclohexene heated to 140° C is injected into the third zone which operates at 260° C.

Contrary to the preceding example, the contents of additive given to Table II do not take recycling into account. The optical properties of the film are measured in accordance with ASTM standard D 523 for gloss and D 1003 for haze.

TABLE II

| Cyclohexene (ppm) | Clarity | Gloss | Haze |
|---|---|---|---|
| 0 | 41 | 20.8 | 4.8 |
| 3 | 42 | 20.0 | 4.7 |
| 7 | 44 | 18.5 | 5.0 |
| 21 | 47 | 17.2 | 5.5 |

It is quite surprising to observe, for these three characteristic properties, improvements of the order of 15% for such low amount of additive.

EXAMPLE 3

Polymerization of ethylene is effected in the same 0.9 liter homogeneous reactor used in Example 1. Tertbutyl perbenzoate is used as the initiator and alpha-pinene as the additive in concentrations of 1.5 to 30 g/l in a $C_{11}$–$C_{12}$ cut of saturated hydrocarbons as a solvent. The initiator and additive are injected into the reactor at a temperature of 140° C. The temperature of the reactor is maintained at 220° C and the pressure at 1100 bars.

Table III gives the initiator consumption related directly to the weight of polymer, the conversion rate being constant for all tests.

TABLE III

| alpha-pinene (ppm) | 0 | 33 | 72 | 125 | 191 |
|---|---|---|---|---|---|
| S.I.C. (mg/kg) | 560 | 540 | 475 | 520 | 585 |

The relative reduction in the specific consumption is 15% for a content of about 72 ppm of additive. A good improvement in the optical properties is also observed as before.

EXAMPLE 4

With the same reactor as in Example 3, polymerization of ethylene is effected at 260° C under a pressure of 1300 bars in the presence of styrene as the additive compound. The styrene is used in concentrations of 10 to 15 g/l in a solution of ditertbutyl peroxide as the initiator and the solution and additive are heated and injected into the reactor at 140° C.

Table IV shows the effect of varying the amount of styrene on the initiator consumption.

TABLE IV

| Styrene (ppm) | 0 | 67 | 125 | 250 |
|---|---|---|---|---|
| S.I.C. (mg/kg) | 80.5 | 68 | 74 | 103 |

The reduction of consumption at the minimum point is about 16%.

EXAMPLE 5

Ethylene is polymerized in the same reactor as in Example 3 under a pressure of 1500 bars and at a temperature of 260° C and the product is extruded directly on leaving the separator. Cyclopentene as the additive is added to a solution of tertbutyl peroxide and the solution is heated and injected into the reactor at 140° C.

In Table V, the measurement of the specific consumption is related to constant production to account for the variations of the conversion rate.

TABLE V

| Cyclopentene (ppm) | 0 | 37 | 55 | 93 | 158 | 252 |
|---|---|---|---|---|---|---|
| S.I.C. (m.moles/kg2) | 8.75 | 8.15 | 7.7 | 7.6 | 6.7 | 5.8 |

It will be seen that the reduction in consumption is continued up to contents higher than for the other compounds of the invention and reaches 33% at about 250 ppm. The correlative improvement in the quality of the resin remains satisfactory.

EXAMPLE 6

The test of Example 1 is repeated under identical conditions except that the injection temperature of the initiator and cyclohexene is 200° C in this example.

Table VI shows the specific initiator consumption related to constant production as a function of the cyclohexene content.

TABLE VI

| Cyclohexene (ppm) | 0 | 20 | 36 | 54.5 | 78.5 |
|---|---|---|---|---|---|
| S.I.C. (m.moles/Kg2) | 9.4 | 7.5 | 4.1 | 3.25 | 2.45 |

It will be observed that the initiator consumption is reduced by 74% by introducing about 80 ppm cyclohexene into the polymerization mixture.

EXAMPLE 7

The test of Example 1 is repeated under identical conditions except that the injection temperature of the initiator and cyclohexene is 250° C in this example.

Table VII shows the specific initiator consumption related to constant production as a function of the cyclohexene content.

TABLE VII

| Cyclohexene (ppm) | 0 | 20 | 62 | 114 |
|---|---|---|---|---|
| S.I.C. (m.moles/Kg2) | 11.9 | 9.2 | 6.5 | 3.8 |

Here it can be observed that the initiator consumption is reduced by 68% when about 115 ppm of cyclohexene is used as the additive. What is claimed is:

1. In a process for the radical polymerization of ethylene in a stirred autoclave reactor in a reaction medium at temperatures above 220° C and under pressures above 1000 bars in the presence of oxygen, peroxides or peresters as initiators, the improvement comprising injecting into the reaction medium, at the same time as the initiator up to 500 ppm based on the weight of the ethylene of an additive compound selected from the group consisting of cyclic olefins having from 5 to 12 carbon atoms and a ring of 5 to 9 members and styrene and its homologues bearing alkyl substituents on the benzene nucleus.

2. In a process for the radical polymerization of ethylene in a stirred autoclave reactor in a reaction medium at temperatures above 220° C and under pressures above 1000 bars in the presence of oxygen, peroxides or peresters as initiators, the improvement comprising injecting into the reaction medium, at the same time as the initiator up to 500 ppm based on the weight of the ethylene of an additive compound selected from the group consisting of cyclopentene, cyclohexene, alphapinene, cycloheptene, and cyclooctene.

3. The process according to claim 2, in which the additive is cyclohexene.

4. The process according to claim 1, in which the additive is styrene.

5. The process according to claim 1, in which the additive is injected into the reaction medium at a temperature above 180° C.

* * * * *